(12) United States Patent
Suzuki et al.

(10) Patent No.: US 11,399,110 B2
(45) Date of Patent: Jul. 26, 2022

(54) ELECTRIC APPARATUS AND CONTROL METHOD THEREFOR

(71) Applicant: CANON KABUSHIKI KAISHA, Tokyo (JP)

(72) Inventors: Yuichiro Suzuki, Yokohama (JP); Eriko Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/390,544

(22) Filed: Apr. 22, 2019

(65) Prior Publication Data

US 2019/0335055 A1    Oct. 31, 2019

(30) Foreign Application Priority Data

Apr. 27, 2018   (JP) .............................. JP2018-087538

(51) Int. Cl.
| | | |
|---|---|---|
| *G06F 15/00* | (2006.01) | |
| *H04N 1/10* | (2006.01) | |
| *H04N 1/00* | (2006.01) | |
| *B41J 2/07* | (2006.01) | |

(52) U.S. Cl.
CPC .............. *H04N 1/1035* (2013.01); *B41J 2/07* (2013.01); *H04N 1/00798* (2013.01)

(58) Field of Classification Search
CPC ..... H04N 1/1035; H04N 1/00798; B41J 2/07; B41J 19/207; B41J 19/202; B41J 29/38
See application file for complete search history.

(56) References Cited

U.S. PATENT DOCUMENTS

| | | | | |
|---|---|---|---|---|
| 5,527,121 | A  * | 6/1996 | Santon | ................... B41J 19/202 |
| | | | | 347/37 |
| 8,573,727 | B2 | 11/2013 | Iwai | |
| 9,621,082 | B2 | 4/2017 | Tanami | |
| 10,946,679 | B2 * | 3/2021 | Kiyama | ................. B41J 25/006 |
| 2003/0178958 | A1 * | 9/2003 | Akiyama | .................. H02P 1/22 |
| | | | | 318/280 |

(Continued)

FOREIGN PATENT DOCUMENTS

JP        2011-102012 A       5/2011

OTHER PUBLICATIONS

U.S. Appl. No. 16/386,581, Isao Iwai Kota Kiyama Haruhiko Tanami Yuichiro Suzuki, filed Apr. 17, 2019.

(Continued)

*Primary Examiner* — Huo Long Chen
(74) *Attorney, Agent, or Firm* — Venable LLP

(57) ABSTRACT

An apparatus detects movement of a target object, estimates a control quantity for first feedback control for the target object at a first period, based on a detection signal, and estimates a first state quantity of the target object and a second state quantity obtained by time differentiation of the first state quantity in order to perform second feedback control for the target object at a second period shorter than the first period, based on the detection signal. The apparatus generates a first operation quantity for the first feedback control, based on the estimated control quantity, generates a second operation quantity for the second feedback control, based on the estimated first and second state quantities, and determines an output value, based on a result of comparing the second operation quantity with a maximum value of the first operation quantity.

17 Claims, 13 Drawing Sheets

(56) References Cited

U.S. PATENT DOCUMENTS

| | | | |
|---|---|---|---|
| 2004/0119778 A1 | 6/2004 | Naito | |
| 2006/0008310 A1* | 1/2006 | Morikawa | B41J 19/202 |
| | | | 400/283 |
| 2006/0127156 A1 | 6/2006 | Takahashi | |
| 2006/0268043 A1 | 11/2006 | Akiyama | |
| 2014/0139848 A1* | 5/2014 | Kanzawa | B41J 19/142 |
| | | | 358/1.5 |
| 2014/0146103 A1* | 5/2014 | Yokozawa | B41J 19/205 |
| | | | 347/14 |
| 2015/0097896 A1* | 4/2015 | Kawafuji | B41J 19/205 |
| | | | 347/37 |
| 2015/0314619 A1* | 11/2015 | Tanami | B41J 25/006 |
| | | | 347/39 |
| 2017/0217230 A1* | 8/2017 | Yokozawa | G06K 15/40 |
| 2019/0329573 A1* | 10/2019 | Kiyama | H02P 23/20 |

OTHER PUBLICATIONS

U.S. Appl. No. 16/390,569, Kota Kiyama Yuichiro Suzuki Isao Iwai Haruhiko Tanami, filed Apr. 22, 2019.
U.S. Appl. No. 16/390,594, Haruhiko Tanami Yuichiro Suzuki Isao Iwai Kota Kiyama, filed Apr. 22, 2019.

* cited by examiner

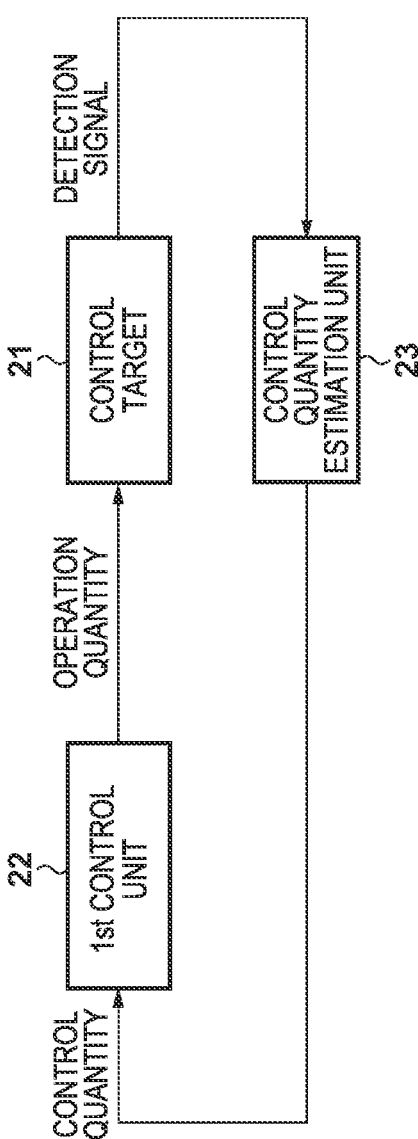
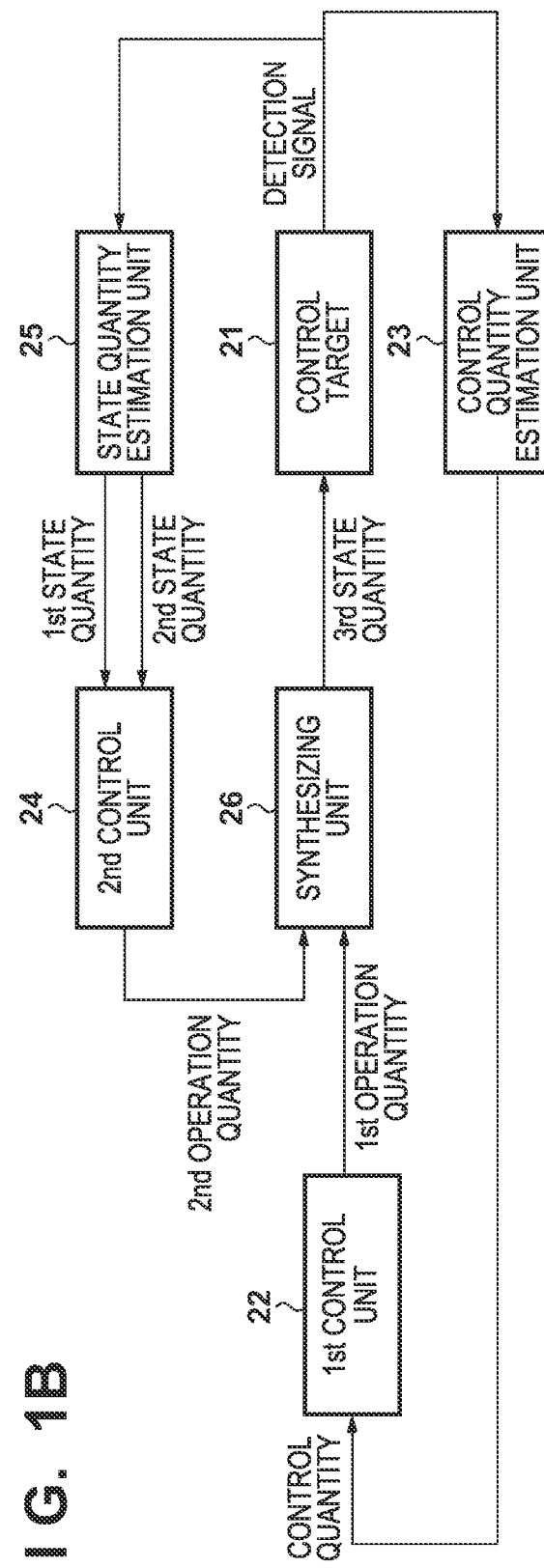
FIG. 1A
FIG. 1B

ELECTRIC APPARATUS AND CONTROL METHOD THEREFOR

BACKGROUND OF THE INVENTION

Field of the Invention

The present invention relates to an electric apparatus and a control method therefor, and particularly to a technique of controlling driving of a moving object such as the carriage of a serial type printing apparatus.

Description of the Related Art

As for driving of a carriage that reciprocally moves by a motor in a serial type printer, feedback control such as PID control using an encoder is common practice. In a serial type inkjet printer, a driving unit that scans a carriage mounted with a printhead for discharging ink emphasizes a velocity vibration at the time of scanning the carriage to stabilize an ink landing position. Thus, it is required to implement control for stabilizing a velocity vibration of the carriage.

In a printing apparatus and a gain correction method described in Japanese Patent Laid-Open No. 2011-102012, a constant (gain) for PID control is corrected in accordance with a correction ratio based on a velocity vibration quantity for a predetermined period during which a specific control target is operated. According to Japanese Patent Laid-Open No. 2011-102012, as the velocity vibration quantity is larger, the correction ratio for PID control can be made smaller. As a result, an excessive vibration is suppressed, thereby making it possible to implement convergence of the velocity vibration of the control target.

In the printing apparatus and the gain correction method described in Japanese Patent Laid-Open No. 2011-102012, to converge the velocity vibration of the control target, the control gain of the control target is decreased resultantly. Therefore, although it is possible to suppress an excessive vibration of a control target object, the responsiveness of the control target object may be spoiled. That is, compatibility between traceability and vibration suppression in a change in state of the control target object may become an issue.

SUMMARY OF THE INVENTION

Accordingly, the present invention is conceived as a response to the above-described disadvantages of the conventional art.

For example, an electric apparatus and a control method therefor according to this invention are capable of achieving compatibility between traceability of feedback control and vibration suppression of a control target object.

According to one aspect of the present invention, there is provided an electric apparatus for controlling movement of a target object, comprising: a detection unit configured to detect the movement of the target object; a first estimation unit configured to estimate, based on a detection signal output from the detection unit, a control quantity for performing first feedback control for the target object at a first period; a second estimation unit configured to estimate, based on the detection signal output from the detection unit, a first state quantity of the target object and a second state quantity obtained by time differentiation of the first state quantity in order to perform second feedback control for the target object at a second period shorter than the first period; a first generation unit configured to generate, based on the control quantity estimated by the first estimation unit, a first operation quantity for the first feedback control; a second generation unit configured to generate, based on the first state quantity and the second state quantity estimated by the second estimation unit, a second operation quantity for the second feedback control; a comparison unit configured to compare the second operation quantity with a maximum value of values that can be taken by the first operation quantity; and a control unit configured to output, if, as a result of the comparison by the comparison unit, the maximum value of the values that can be taken by the first operation quantity is not smaller than the second operation quantity, the second operation quantity to control the movement of the target object, and output, if the maximum value of the values that can be taken by the first operation quantity is smaller than the second operation quantity, the first operation quantity to control the movement of the target object.

According to another aspect of the present invention, there is provided an electric apparatus for controlling movement of a target object, comprising: a detection unit configured to detect the movement of the target object; a first estimation unit configured to estimate, based on a detection signal output from the detection unit, a control quantity for performing first feedback control for the target object at a first period; a second estimation unit configured to estimate, based on the detection signal output from the detection unit, a first state quantity of the target object and a second state quantity obtained by time differentiation of the first state quantity in order to perform second feedback control for the target object at a second period shorter than the first period; a first generation unit configured to generate, based on the control quantity estimated by the first estimation unit, a first operation quantity for the first feedback control; a storage unit configured to store the first operation quantity while updating the first operation quantity at the first period; a second generation unit configured to generate, based on the first state quantity and the second state quantity estimated by the second estimation unit, a second operation quantity for the second feedback control; a comparison unit configured to compare the first operation quantity obtained at a timing of generating the second operation quantity with the first operation quantity stored in the storage unit; and a control unit configured to output the second operation quantity if, as a result of the comparison by the comparison unit, the first operation quantities match, and suppress output of the second operation quantity if the first operation quantities do not match.

According to still another aspect of the present invention, there is provided a control method for an electric apparatus for controlling movement of a target object, comprising: detecting the movement of the target object; estimating, based on a detection signal acquired in the detecting, a control quantity for performing first feedback control for the target object at a first period; estimating, based on the detection signal acquired in the detecting, a first state quantity of the target object and a second state quantity obtained by time differentiation of the first state quantity in order to perform second feedback control for the target object at a second period shorter than the first period; generating, based on the estimated control quantity, a first operation quantity for the first feedback control; generating, based on the estimated first state quantity and the estimated second state quantity, a second operation quantity for the second feedback control; comparing the second operation quantity with a maximum value of values that can be taken by the first operation quantity; and outputting, if, as a result of the comparison, the maximum value of the values that can be taken by the first operation quantity is not smaller than the second operation quantity, the second operation quantity to control the movement of the target object, and outputting, if the maximum value of the values that can be taken by the first operation quantity is smaller than the second operation quantity, the first operation quantity to control the movement of the target object.

According to still another aspect of the present invention, there is provided a control method for an electric apparatus for controlling movement of a target object, comprising: detecting the movement of the target object; estimating, based on a detection signal acquired in the detecting, a control quantity for performing first feedback control for the target object at a first period; estimating, based on the detection signal acquired in the detecting, a first state quantity of the target object and a second state quantity obtained by time differentiation of the first state quantity in order to perform second feedback control for the target object at a second period shorter than the first period; generating, based on the estimated control quantity, a first operation quantity for the first feedback control; storing the first operation quantity in a register while updating the first operation quantity at the first period; generating, based on the estimated first state quantity and the estimated second state quantity, a second operation quantity for the second feedback control; comparing the first operation quantity obtained at a timing of generating the second operation quantity with the first operation quantity stored in the register; and outputting the second operation quantity if, as a result of the comparison in the comparing, the first operation quantities match, and suppressing output of the second operation quantity if the first operation quantities do not match.

The invention is particularly advantageous since it is possible to achieve compatibility between traceability of feedback control and vibration suppression of a control target object.

Further features of the present invention will become apparent from the following description of exemplary embodiments (with reference to the attached drawings).

BRIEF DESCRIPTION OF THE DRAWINGS

FIGS. 1A and 1B are block diagrams each showing a feedback control arrangement in a driving control unit of a carriage motor of a printing apparatus;

DESCRIPTION OF THE EMBODIMENTS

Figure 2:
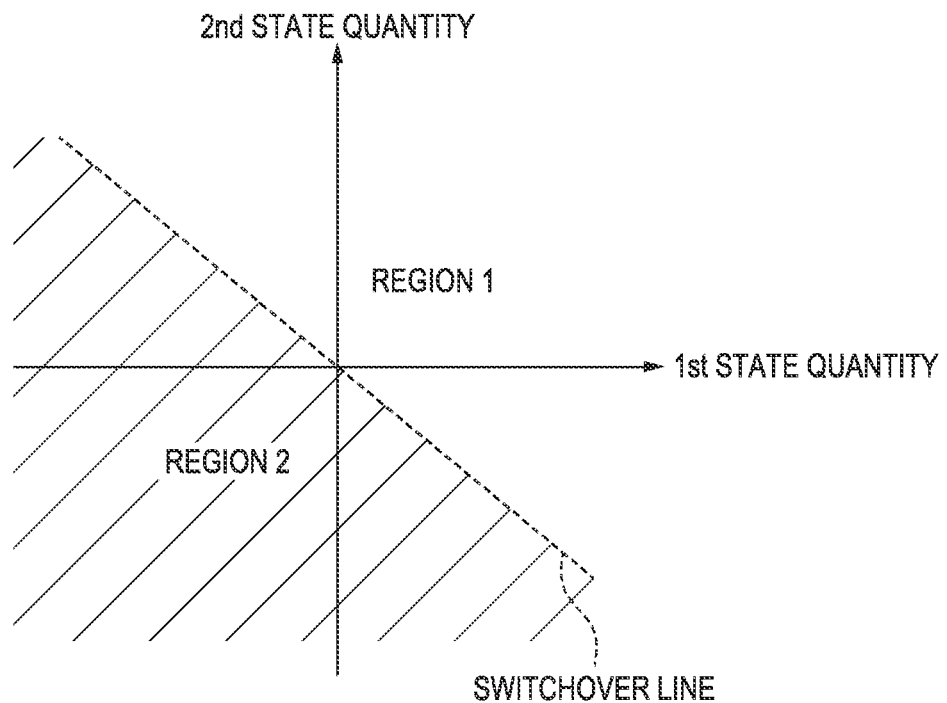
FIG. 2 is a view showing a two-dimensional coordinate space representing the relationship between the first and the second state quantities.

Exemplary embodiments of the present invention will now be described in detail in accordance with the accompanying drawings.

In the following description, control of driving of a motor that moves a carriage of a serial type printing apparatus as an exemplary example of an electric apparatus will be exemplified. However, the present invention is not limited to the carriage of the printing apparatus, and motor control according to the present invention is applicable to any unit that moves an object by driving a motor. For example, in the printing apparatus, motor control is applicable to control of driving of a conveyance motor used to convey a print medium such as a print sheet. The present invention also includes a scanner apparatus that optically reads an image of an original while moving a CCD line scanner or CIS by driving a motor.

1. Explanation of Feedback Control

FIGS. 1A and 1B are block diagrams each showing a feedback control arrangement in a driving control unit of a carriage motor of a printing apparatus. FIG. 1A is a block diagram showing a general control arrangement. FIG. 1B is a block diagram showing a control arrangement used in this embodiment.

First, the general feedback control arrangement will be described with reference to FIG. 1A.

As shown in FIG. 1A, a detection signal (the position and velocity of a carriage) that detects the state of a control target (for example, a carriage) 21 is output to a control quantity estimation unit (for example, a CPU) 23 to estimate the control quantity of position/velocity information or the like. The control quantity is output to a first control unit (for example, a carriage driver) 22 to calculate an operation quantity for converging the control target 21 to a target value. When the operation quantity is output to the control target 21, a feedback control loop is formed.

To stably move the control target, it is necessary to set various parameters while ensuring an allowance in terms of control in consideration of the characteristic of the control target. If the allowance is insufficient, a vibration occurs, and an oscillation phenomenon may lead to an uncontrollable state. On the other hand, if the allowance is too large, the traceability performance of the control target deteriorates but it is unavoidable to impose a restriction on the traceability performance for vibration suppression.

Next, the feedback control arrangement used in this embodiment will be described with reference to FIG. 1B.

As shown in FIG. 1B, in feedback control, in addition to the feedback control loop shown in FIG. 1A, another feedback control loop using the detection signal from the control target 21 is formed. That is, the detection signal that detects the state of the control target 21 is output to the control quantity estimation unit 23 to estimate the control quantity of the position/velocity information of the carriage or the like. The control quantity is output to the first control unit 22, and the first control unit 22 calculates the first operation quantity for converging the control target 21 to the target value. Then, the first control unit 22 outputs the first operation quantity to the control target 21 via the synthesizing unit 26, thereby forming the first feedback loop.

On the other hand, the detection signal that detects the state of the control target 21 is also output to a state quantity estimation unit 25, and the state quantity estimation unit 25 estimates the first and second state quantities. The second state quantity is obtained by the time differentiation of the first state quantity. More specifically, the first and second state quantities are values formed from a combination of a position and a velocity or a combination of a velocity and an acceleration. These values are output to a second control unit 24. The second control unit 24 calculates the second operation quantity. Next, the second control unit 24 outputs the second operation quantity, and a synthesizing unit 26 synthesizes the first and second operation quantities, and outputs a synthesizing result to the control target 21. The second feedback loop "control target 21→state quantity estimation unit 25→second control unit 24→synthesizing unit 26→control target 21" is formed.

Since the first and second state quantities have the relationship between, for example, the position (x) and velocity (v) of the carriage or between the velocity (v) and acceleration (a) of the carriage, the relationship between the two state quantities (two variables) can be represented by a two-dimensional space.

FIG. 2 is a view showing a two-dimensional coordinate space representing the relationship between the first and second state quantities. Referring to FIG. 2, the abscissa defines the first state quantity and the ordinate defines the second state quantity.

As shown in FIG. 2, two divided regions are defined in advance on the plane, and the plane is divided into two regions by a function called a switchover line. These divided regions will be referred to as regions 1 and 2 hereinafter. The function representing the switchover line is a linear function represented by a relationship "S2=k×S1" where S1 represents the first state quantity and S2 represents the second state quantity. Note that k represents a switchover coefficient.

As shown in FIG. 2, with respect to the switchover line, an upper region (white) is region 1 and a lower region (hatched) is region 2. If there is the relationship between the first and second state quantities in region 1, a positive operation quantity is output. If there is the relationship between the first and second state quantities in region 2, a negative operation quantity is output. Note that in accordance with an operation condition, a negative sign may be assigned to region 1 and a positive sign may be assigned to region 2. When the sign is switched over every time the two regions are crossed, the operation quantity implements movement corresponding to a switching operation. The second control unit 24 outputs such operation quantity as the second operation quantity to the control target 21 via the synthesizing unit 26.

The first and second operation quantities are updated asynchronously. The synthesizing unit 26 adds the quantities while adjusting the update timings, and outputs an added value as the third operation quantity to the control target 21.

An example in which the feedback control shown in FIG. 1B is applied to control of the velocity of the carriage that reciprocates while being mounted with a printhead in the serial type printing apparatus will now be described.

Figure 3:
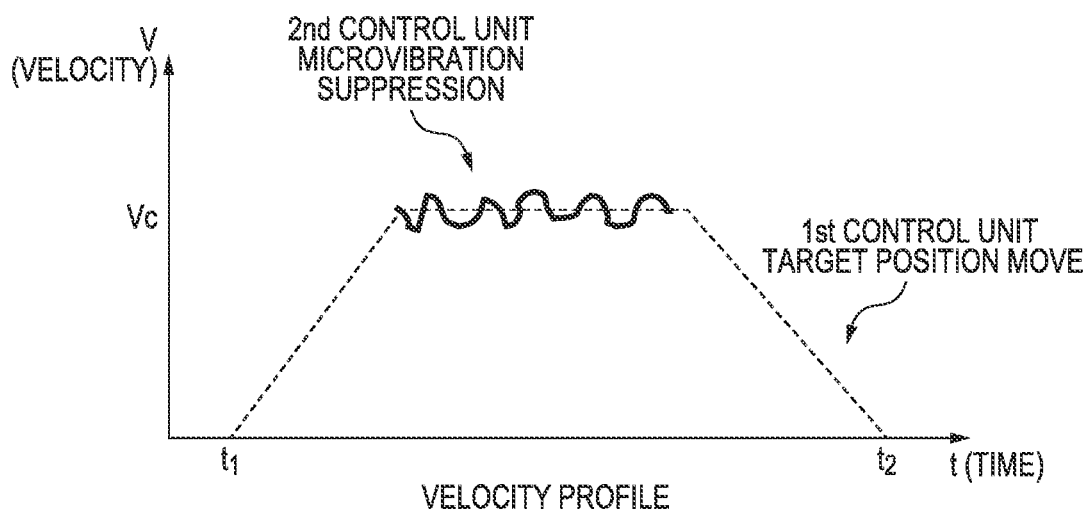
FIG. 3 is a timing chart showing a velocity profile of a carriage as a control target.

FIG. 3 is a timing chart showing the velocity profile of the carriage as the control target.

Referring to FIG. 3, the abscissa represents time (t) and the ordinate represents the velocity (v) of the carriage. FIG. 3 shows the velocity profile in which the carriage starts to move from a home position at $t=t_1$, accelerates to reach a velocity ye, transitions to constant movement, and then decelerates to stop at $t=t_2$. However, the actual carriage motion is not ideal, and the velocity of the carriage micro-vibrates due to the influence of an external disturbance or the like during constant movement. The micro-vibration of the velocity indicates the occurrence of positive and negative accelerations at a very short period.

In FIG. 3, the ideal velocity profile is indicated by a broken line and a micro-velocity vibration during constant movement is indicated by a thick solid line.

In the feedback control according to this embodiment, the first control unit 22 is responsible for control of the velocity profile indicated by the broken line, and moves the carriage as control target to a target position in accordance with a desired acceleration condition and velocity condition. The first control unit 22 executes PID control calculation generally widely used, sets various parameters in consideration of an allowance in terms of control, determines a control band, and then implements desired movement while suppressing a vibration in the control band.

On the other hand, the second control unit 24 is responsible for control of suppressing a micro-velocity vibration indicated by the thick solid line. The second control unit 24 suppresses a vibration phenomenon (velocity vibration) in a high-frequency band exceeding the control band of the first control unit 22. To suppress such velocity vibration, it is necessary to perform, at a short period corresponding to the period of the velocity vibration, an operation of giving a positive acceleration as an operation quantity for a negative acceleration that occurs while giving a negative acceleration as an operation quantity for a positive acceleration that occurs. Therefore, since a sufficiently short control period is required to implement the control performance, the second control unit 24 executes control at a control period at least shorter than that of the first control unit 22.

When the control period is sufficiently short, the second control unit 24 can implement a high-speed switching operation, and can perform vibration suppression (velocity vibration suppression) up to a region exceeding the control band of the first control unit 22. Therefore, even if the state of the carriage as the control target changes and a vibration phenomenon occurs when only feedback control by the first control unit 22 is performed, the second control unit 24 can suppress a vibration to build a stable control system without spoiling the traceability.

In summary, the role of the first control unit 22 that performs the conventional feedback control is to converge, to the target position, the carriage as the control target having the velocity profile formed from acceleration, a constant velocity, and deceleration. The first control unit 22 forms a feedback loop (first feedback loop) by PID control using the control quantity formed from the position and velocity information of the carriage. On the other hand, the role of the second control unit 24 is to suppress a micro-velocity vibration of the carriage that cannot be controlled by the first control unit 22. The second control unit 24 forms a feedback loop (second feedback loop) by high-speed switching control using a state quantity formed from a combination of a position and a velocity or a velocity and an acceleration. Therefore, control of the second feedback loop is executed at a calculation period shorter than that of the first feedback loop.

2. Explanation of Application Example of Feedback Control

A serial type printing apparatus to which control of forming the two feedback loops explained with reference to FIG. 1B is applied will be described.

<Explanation of Printing Apparatus (FIGS. 4 and 5)>

Figure 4:
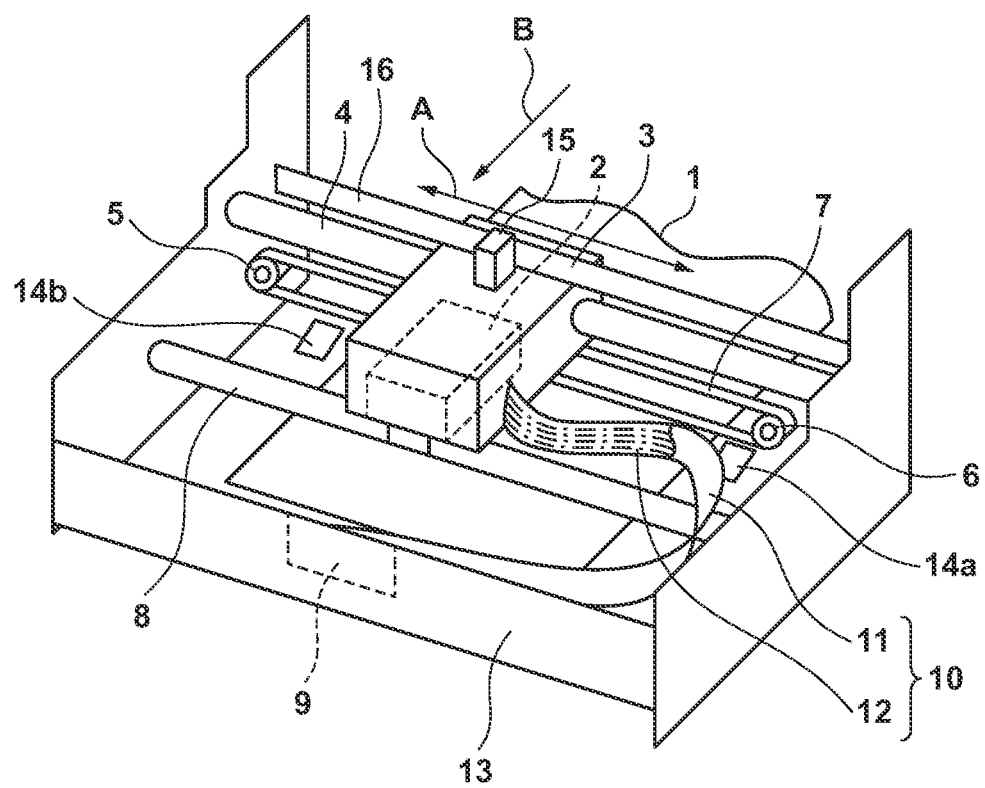
FIG. 4 is a perspective view showing the main mechanism part of an inkjet printing apparatus according to an exemplary embodiment of the present invention.

FIG. 4 is an external perspective view showing the arrangement of the printing apparatus mounted with an inkjet printhead (to be referred to as a printhead hereinafter) that discharges ink droplets in accordance with an inkjet method, according to the exemplary embodiment of the present invention.

A carriage (moving object) 3 mounted with a printhead 2 is supported slidably by a guide shaft 4, and reciprocally moves above a print medium (sheet) 1. A carriage motor (DC motor) 5 with a pulley is arranged at one end of the moving range of the carriage 3, an idle pulley 6 is arranged at the other end, and a timing belt 7 is looped between the carriage motor 5 and the idle pulley 6, thereby connecting the carriage 3 to the timing belt 7.

To prevent the carriage 3 from rotating about the guide shaft 4, a support member 8 installed to extend in parallel to the guide shaft 4 is installed, and the carriage 3 is also supported slidably by the support member 8. In the printhead 2, a number of print elements are provided and an FFC (Flexible Flat Cable) 11 for supplying the driving signals of the print elements from the main body portion of the printing apparatus to the printhead 2 is arranged. The FFC 11 has a long thin film shape, a conductive pattern for transmitting a driving signal is formed in the inside or surface of the FFC 11, and the FFC 11 has flexibility so that it bends along with the movement of the carriage 3 to move the central position of bending.

Furthermore, an ink tank (not shown) is arranged outside the carriage 3, and a tube 12 that supplies, to the printhead 2, ink contained in the ink tank is provided. The tube 12 has flexibility so that it bends along with the movement of the carriage 3 to move the central position of bending. A connecting member 10 formed from the FFC 11 and the tube 12 is connected between the carriage 3 and a fixing portion 9 of the main body 13 of the printing apparatus.

Furthermore, a linear scale 16 that is used to acquire the position information of the carriage 3 is arranged in parallel to the moving direction (main scanning direction) of the carriage, and is configured to be read by an encoder sensor 15 attached to the carriage 3. Ink collection ports 14*a* and 14*b* for collecting ink preliminarily discharged by the printhead 2 are provided on both the outsides in the width direction of the print medium 1. The preliminary discharge indicates an operation for discharging, at positions irrelevant to printing, ink adhered to the distal end portions of nozzles immediately before the start of printing or during execution of printing.

With this arrangement, the carriage 3 reciprocally moves in a direction (main scanning direction) of an arrow A. The print medium 1 is conveyed by a conveyance motor (not shown) in a direction (sub-scanning direction) of an arrow B vertically intersecting the carriage 3.

Figure 5:
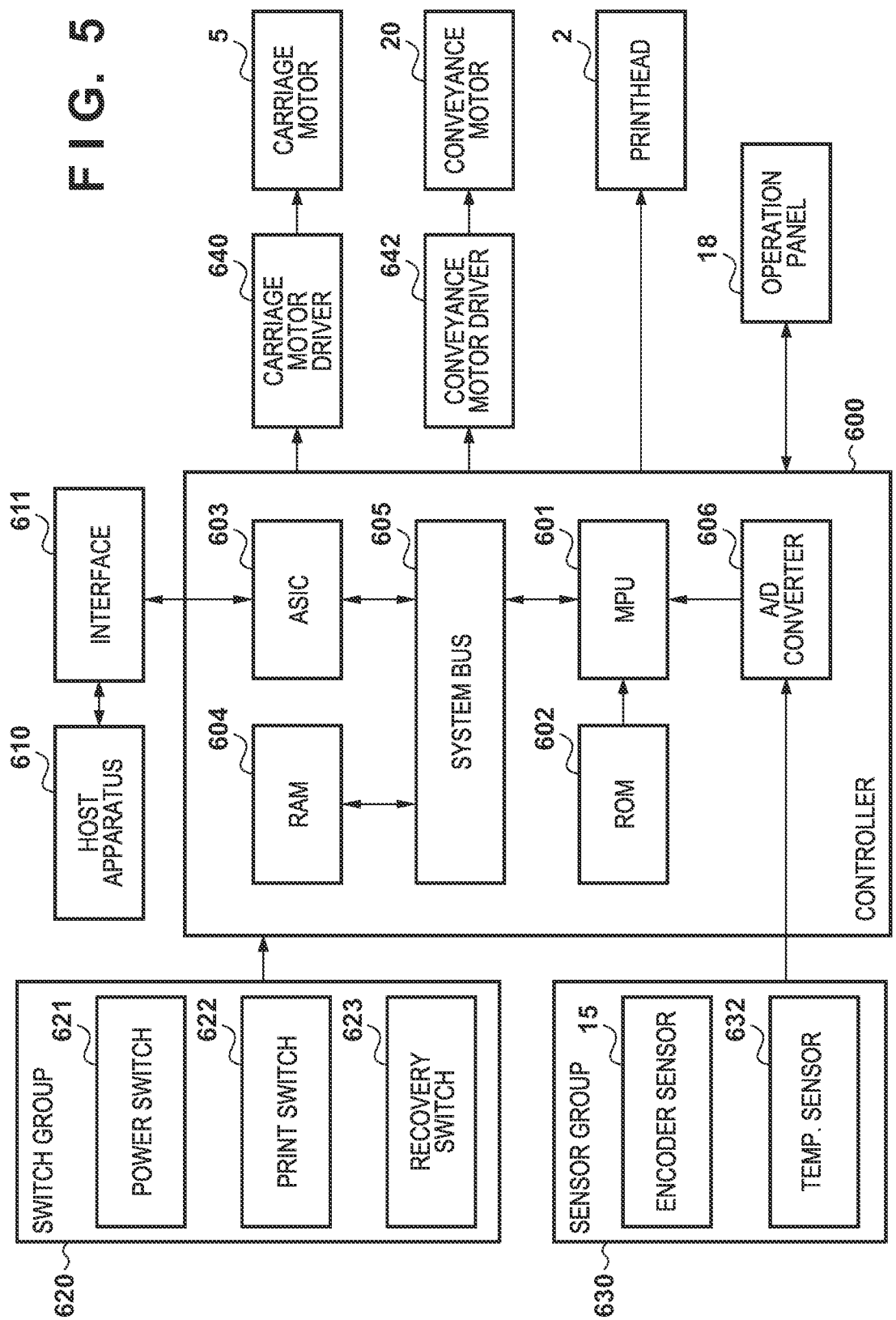
FIG. 5 is a block diagram showing an overview of the control arrangement of the printing apparatus shown in FIG. 4.

FIG. 5 is a block diagram showing the control arrangement of the printing apparatus shown in FIG. 4.

As shown in FIG. 5, a controller 600 is formed by an MPU 601, a ROM 602, an ASIC (Application Specific Integrated Circuit) 603, a RAM 604, a system bus 605, an A/D converter 606, and the like. The ROM 602 stores an program corresponding to a control sequence (to be described later), a required table, and other fixed data.

The ASIC 603 generates control signals for controlling the carriage motor 5, a conveyance motor 20, and the printhead 2. The RAM 604 is used as a loading area of image data, a work area for executing a program, and the like. The system bus 605 interconnects the MPU 601, the ASIC 603, and the RAM 604 to exchange data. The A/D converter 606 receives an analog signal from a sensor group (to be described below), performs A/D conversion, and supplies a digital signal to the MPU 601.

Note that in the control arrangement shown in FIG. 5, the ASIC 603 and the MPU 601 are separately provided. However, the MPU 601 may be included in the ASIC 603.

Referring to FIG. 5, reference numeral 610 denotes a host apparatus serving as an image data supply source. Image data, a command, a status, and the like are transmitted/received between the host apparatus 610 and the printing apparatus via an interface (I/F) 611 using, for example, a protocol based on the USB standard.

Furthermore, reference numeral 620 denotes a switch group which is formed from a power switch 621, a print switch 622 used to issue a print start instruction or the like, a recovery switch 623, and the like.

Reference numeral 630 denotes a sensor group for detecting an apparatus status, which is formed from detectors such as the encoder sensor 15, a temperature sensor 632, and the like.

Reference numeral 640 denotes a carriage motor driver that drives the carriage motor 5 for causing the carriage 3 to reciprocally scan in the direction of the arrow A; and 642, a conveyance motor driver that drives the conveyance motor 20 for conveying a print medium P.

At the time of print scanning by the printhead 2, the ASIC 603 transfers data for driving the print elements (heaters for discharge) to the printhead 2 while directly accessing the memory area of the RAM 604. In addition, this printing apparatus includes, as a user interface, an operation panel 18 formed by an LCD or LED. From the viewpoint of apparatus implementation, the switch group 620 may be included in the operation panel 18.

The ASIC 603 operates as a calculation processing unit to perform image processing and actuator control, and executes calculation processing by receiving a command from the MPU 601. Feedback control calculation is partially executed by the ASIC 603, and details thereof will be described later. The MPU 601 is responsible for part of calculation for feedback control of the carriage 3, and executes driving calculation of the carriage motor 5 in accordance with a print sequence. When the host apparatus 610 issues a print command via the interface 611, the carriage 3 reciprocally operates for a print operation.

3. Details of Feedback Control Arrangement for Carriage Control of Printing Apparatus Application of the feedback control arrangement described with reference to FIG. 1B to carriage driving control in the printing apparatus described with reference to FIGS. 4 and 5 will be described in detail.

Figure 6:
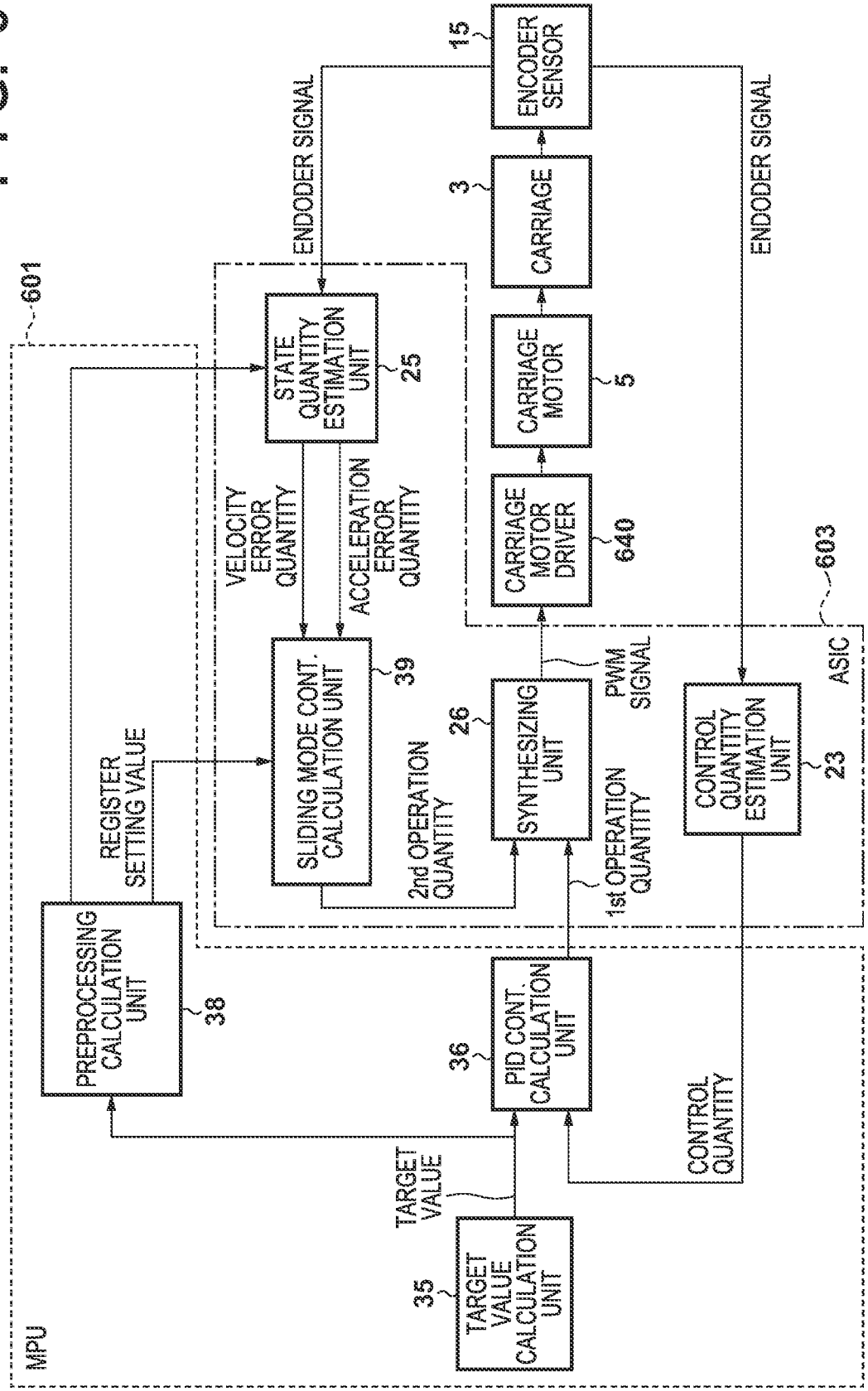
FIG. 6 is a block diagram for explaining details of carriage driving control in the printing apparatus shown in FIGS. 4 and 5.

FIG. 6 is a block diagram for explaining details of carriage driving control in the printing apparatus shown in FIGS. 4 and 5.

Accuracy for causing ink to land at a correct position is required for carriage control of the printing apparatus in order to ensure the print quality by the printhead 2. An ink droplet discharge timing from the printhead 2 is calculated from the moving velocity (v) of the carriage 3, and it is important to minimize a velocity vibration. To achieve this, a vibration target to be suppressed in the feedback control according to this embodiment is the velocity of the carriage.

Therefore, the first and second state quantities in the feedback control described with reference to FIG. 1B are formed from a combination of the velocity and acceleration of the carriage 3, and are input to the second control unit 24.

Furthermore, the control target in the feedback control is the carriage 3, and the encoder sensor 15 outputs encoder signals to the control quantity estimation unit 23 and the state quantity estimation unit 25. In general, two A- and B-phase pulse signals whose phases are different from each other by 90° are used as encoder signals. In this embodiment as well, two A- and B-phase pulse signals are used as the encoder signals. Note that an encoder signal from the encoder sensor 15 need not be input to the A/D converter 606.

Figure 7:
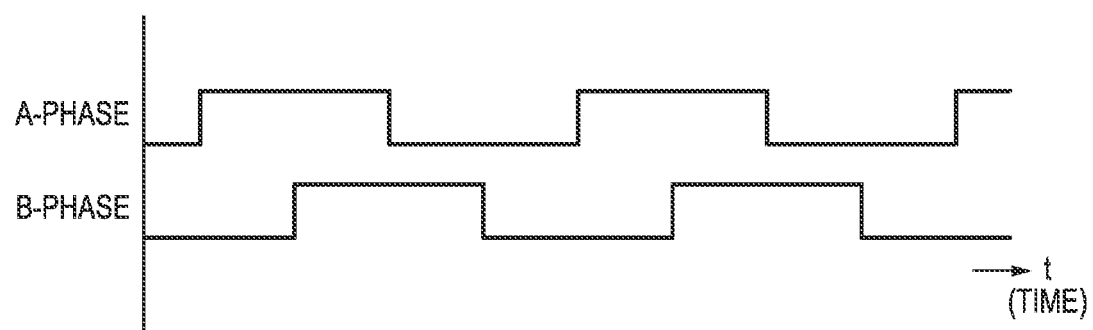
FIG. 7 is a timing chart showing A- and B-phase encoder signals.

FIG. 7 is a timing chart showing the A- and B-phase encoder signals.

The control quantity estimation unit 23 estimates position information by counting the pulse signal, and estimates velocity information by measuring the pulse width of the pulse signal. This position/velocity information or the like is output as a control quantity to a PID control calculation unit 36 corresponding to the first control unit 22.

A target value calculation unit 35 generates a target profile for moving the carriage 3 to a target position in accordance with a desired acceleration condition and velocity condition, and outputs the target profile as a target value. The PID control calculation unit 36 performs PID control calculation using the target value from the target value calculation unit 35 and the control quantity from the control quantity estimation unit 23, and outputs a calculation result as the first operation quantity.

The encoder signal from the encoder sensor 15 is also output to the state quantity estimation unit 25. The state quantity estimation unit 25 also receives a register setting value output from a preprocessing calculation unit 38. The register setting value is a value obtained by replacing, by the preprocessing calculation unit 38, the target value from the target value calculation unit 35 by a value in a unit system used in the state quantity estimation unit 25. The state quantity estimation unit 25 estimates velocity information and acceleration information from the encoder signal, and calculates an error quantity with respect to the register setting value as an operation target. A velocity error quantity and acceleration error quantity as the error quantity are output, as a combination of state quantities in the velocity dimension and acceleration dimension, to a sliding mode control calculation unit 39 corresponding to the second control unit 24.

The sliding mode control calculation unit 39 forms a two-dimensional plane space formed from two variables of the velocity error quantity and the acceleration error quantity. Region determination of the two-dimensional plane described with reference to FIG. 2 is obtained by:

$$S=\text{switchover coefficient} \times \text{acceleration error quantity} + \text{velocity error quantity}$$

If $S>0$, the current state quantity is located in region 1 as the upper portion with respect to the switchover line. On the other hand, if $S<0$, the current state quantity is located in region 2 as the lower portion with respect to the switchover line. If $S=0$, $S=0$ is defined as $S>0$ or $S<0$. The sign of the operation quantity is determined based on the region determination result, and the operation quantity is output as the second operation quantity. Note that the switchover coefficient is updated by the register setting value output from the preprocessing calculation unit 38.

The update timings of the first and second operation quantities will now be described.

The first operation quantity is updated every time the PID control calculation unit 36 is executed. The carriage motor driving control unit (carriage motor driver) of the printing apparatus to which the feedback control shown in FIG. 1B is applied often executes control calculation at a period of about 1 KHz. On the other hand, the second operation quantity is updated every time the sliding mode control calculation unit 39 is executed. A change in pulse of the encoder signal is assumed, and control calculation is executed at a period of about several kHz to 20 kHz. For such inputs having an asynchronous relationship, the synthesizing unit 26 adds them while adjusting the timings. The synthesizing unit 26 outputs a PWM signal based on the addition result of the operation quantities to the carriage motor driver 640. The carriage motor driver 640 rotates the carriage motor 5, and the carriage 3 moves through the timing belt 7.

As is apparent from the above arrangement, the synthesizing unit 26 outputs the PWM signal for driving the carriage motor 5 via the carriage motor driver 640. Therefore, the MPU 601 outputs, as the first operation quantity, a duty value (PWM_Duty value) of a PWM signal waveform for generating a PWM signal. On the other hand, the sliding mode control calculation unit 39 outputs, as the second operation quantity, a duty value (PWM_Duty value) of a PWM waveform of the same dimension as that of the first operation quantity.

Thus, a restriction that the maximum value of duty values to be taken cannot exceed the period of the PWM signal is imposed, and the synthesizing unit 26 operates to satisfy this restriction. In other words, the second operation quantity cannot be equal to or larger than the first operation quantity which becomes the maximum value.

To implement high-speed calculation derived from a change in pulse of the encoder signal, it is assumed that the sliding mode control calculation unit 39 is executed by hardware such as an ASIC.

Referring to FIG. 6, a range surrounded by a two-dot dashed line is implemented in the ASIC 603. As is apparent from FIG. 6, the ASIC 603 is responsible for the functions of the sliding mode control calculation unit 39, the control quantity estimation unit 23, the state quantity estimation unit 25, and the synthesizing unit 26. To the contrary, in FIG. 6, a range surrounded by a thick dotted line is implemented when the MPU 601 executes a program. As is apparent from FIG. 6, the MPU 601 is responsible for the functions of the PID control calculation unit 36, the target value calculation unit 35, and the preprocessing calculation unit 38.

The reason why the MPU 601 and the ASIC 603 share the feedback control is that the update period of the information processed in the portion implemented by the ASIC 603 is shorter than that of the information processed in the portion implemented by the MPU 601.

The preprocessing calculation unit 38 is also executed every time the target value calculation unit 35 updates the target value, and the latest register setting value is set in the register area of the ASIC 603. The preprocessing calculation unit 38 performs calculation for managing, as parameter values, only during the calculation period of the PID control calculation unit 36, some of variable values that change moment by moment in calculation of the phase switchover line executed by the sliding mode control calculation unit 39 or estimation calculation of the state quantity estimation unit 25. Execution of all the feedback control by the ASIC leads to increasing the size of the integrated circuit, and there is a lack of flexibility and versatility of processing. Thus, in this embodiment, the calculation accuracy and the circuit scale are compromised, and the preprocessing calculation unit 38 of the MPU executes part of calculation at the update timing.

A control parameter to be used by the sliding mode control calculation unit 39 may be changed in accordance with the operation state of the carriage 3. In this case, based on the target value of the target value calculation unit 35, a section of one of an acceleration state, a constant velocity state, and a deceleration state, in which the carriage 3 is located is determined. By changing, for each section, the switchover coefficient to be used to calculate the phase switchover line, an appropriate switchover line according to a carriage operation condition is selected to implement rapid convergence.

Figure 8:
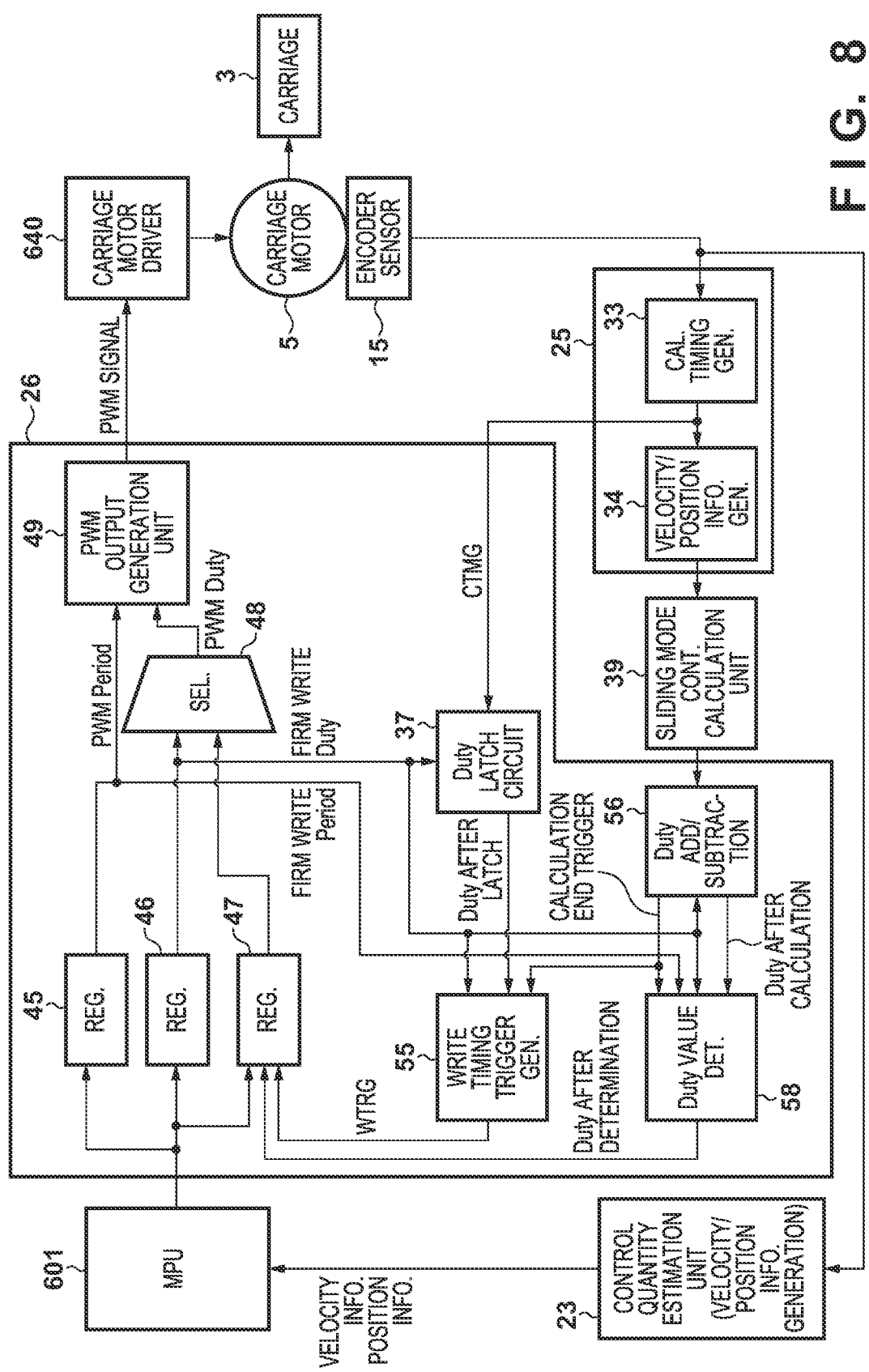
FIG. 8 is a block diagram showing the detailed arrangements of a state quantity estimation unit and a synthesizing unit.

FIG. 8 is a block diagram showing the detailed arrangement of the synthesizing unit 26.

As shown in FIG. 8, the state quantity estimation unit 25 is formed from a calculation timing generation unit 33 and a velocity/acceleration information generation unit 34. The calculation timing generation unit 33 generates a calculation timing signal (CTMG) (to be described later) based on the encoder signal from the encoder sensor 15. The generated calculation timing signal (CTMG) is output to the velocity/acceleration information generation unit 34 and a Duty latch circuit 37 (to be described later).

On the other hand, the control quantity estimation unit 23 forming part of the first feedback loop generates velocity information and position information of the carriage 3 as a control quantity based on the encoder signal output from the encoder sensor 15, and outputs the control quantity to the MPU 601. The MPU 601 operates the PID control calculation unit 36 forming part of the first feedback loop to generate the first operation quantity based on the control quantity.

The synthesizing unit 26 includes three registers 45 to 47, a selector 48, a PWM output generation unit 49, a write timing trigger generation unit 55, a Duty addition/subtraction unit 56, the Duty latch circuit 37, and a Duty value determination unit 58. Then, the PWM output generation unit 49 outputs the PWM signal to the carriage motor driver 640.

More specifically, the MPU 601 calculates the duty value (PMW_Duty value) of the PWM waveform from the control quantity, and writes it in the registers 46 and 47. The written PWM_Duty value is output to the PWM output generation unit 49. On the other hand, the period (PWM_Period value) of the PWM signal is written in the register 45. The written PWM_Period value is output to the PWM output generation unit 49.

The PWM output generation unit 49 that has received the PWM_Period value and the PWM_Duty value outputs the PWM signal to the carriage motor driver 640. Note that the MPU 601, the registers 45 and 46, and the PWM output generation unit 49 form part of the first feedback loop. The carriage motor driver 640 drives the carriage motor 5 in accordance with the input PWM signal waveform. The PWM signal waveform for driving the motor is generally output with respect to a phase signal or an enable signal. The PWM signal waveform used in this embodiment is effective for both the phase signal and the enable signal.

The control target 21, the first control unit 22, and the control quantity estimation unit 23 form the general motor driving control unit, as described with reference to FIG. 1A.

The calculation timing signal (CTMG) can be generated at the timing of the leading or trailing edge of each of the A- and B-phase encoder signals described with reference to FIG. 7. However, the MPU 601 can select an edge to be used to generate the timing signal.

Based on the calculation timing signal (CTMG), the velocity/acceleration information generation unit 34 estimates the velocity information and acceleration information of the carriage 3, and calculates an error quantity with respect to the operation target. A velocity error quantity and an acceleration error quantity as the error quantities are output to the sliding mode control calculation unit 39. The region determination processing shown in FIG. 2 is performed based on the velocity error quantity and acceleration error quantity, a sign is determined based on the region determination result, and the second operation quantity is output to the Duty addition/subtraction unit 56.

Upon receiving the second operation quantity, the Duty addition/subtraction unit 56 executes addition or subtraction for the value in the register 46 in accordance with the sign, and outputs the calculated Duty value and a calculation end trigger to the Duty value determination unit 58.

If the Duty value output from the Duty addition/subtraction unit 56 is larger than the value in the register 45 in which the PWM_Period value is stored, there is a problem that inconsistency between the PWM_Period value and the Duty value occurs.

To solve this problem, the Duty value determination unit 58 compares the setting value (PWM_Period value) in the register 45 with the Duty value calculated by the Duty addition/subtraction unit 56 to make a determination by executing the following processing.

Figure 9:
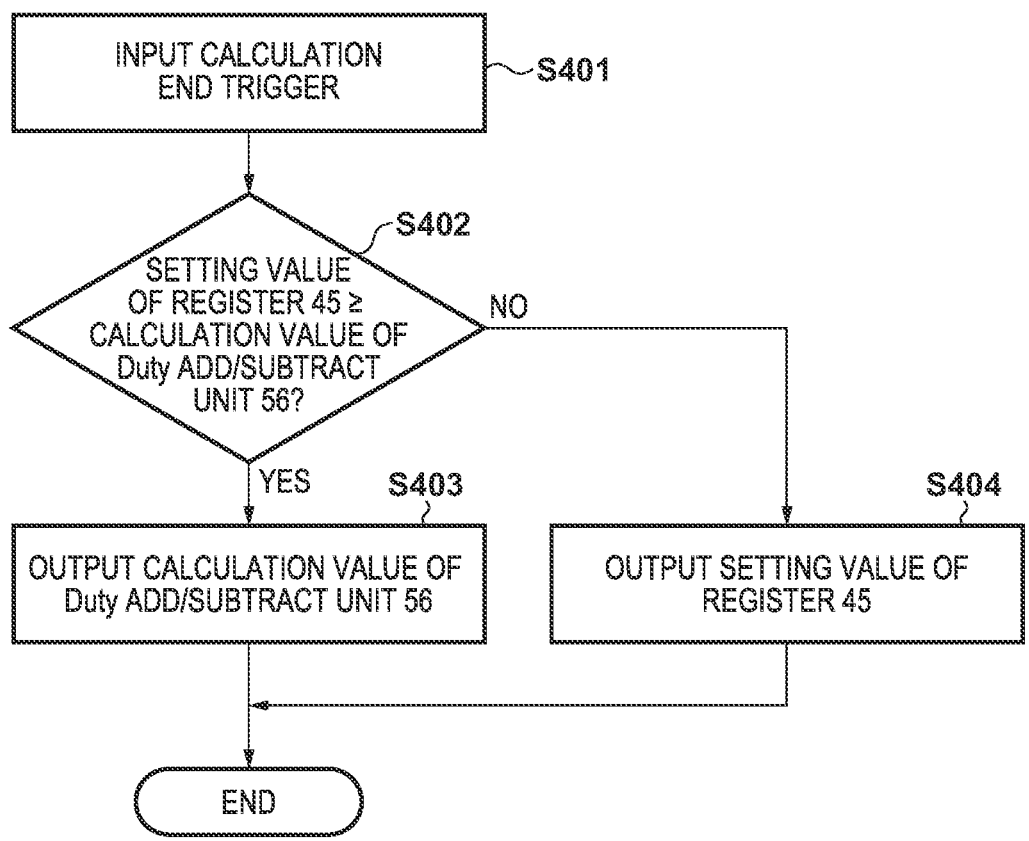
FIG. 9 is a flowchart illustrating the operation of a Duty value determination unit.

FIG. 9 is a flowchart illustrating the operation of the Duty value determination unit 58.

Referring to FIG. 9, in step S401, the Duty addition/subtraction unit 56 executes addition or subtraction for the value in the register 46 in accordance with the sign obtained by the sliding mode control calculation unit 39. After this calculation processing, the Duty value and a calculation end trigger are input to the Duty value determination unit 58.

In step S402, in response to the input of the calculation end trigger, the Duty value determination unit 58 compares the calculated Duty value with the PWM_Period value set in the register 45. If it is determined that PWM_Period value≥calculated Duty value, the process advances to step S403, and the calculated Duty value is output to the register 47. On the other hand, if it is determined that PWM_Period value<calculated Duty value, the process advances to step S404, and the setting value (that is, the PWM_Period value) in the register 45 is output to the register 47.

Upon receiving the input of the calculation timing signal (CTMG) from the calculation timing generation unit 33, the Duty latch circuit 37 latches the setting value in the register 46, and outputs the latched value to the write timing trigger generation unit 55.

The write timing trigger generation unit 55 outputs, to the register 47, a write timing trigger (WTRG) for setting the Duty value output from the Duty value determination unit 58. On the other hand, the setting value in the register 46 is updated by the MPU 601 asynchronously with calculation of the Duty addition/subtraction unit 56. Therefore, if the setting value in the register 46 has already been rewritten at the timing of outputting the write timing trigger (WTRG), there is a problem that inconsistency between the Duty value obtained by servo control of the MPU 601 and that calculated by the Duty addition/subtraction unit 56 occurs.

Figure 10A:
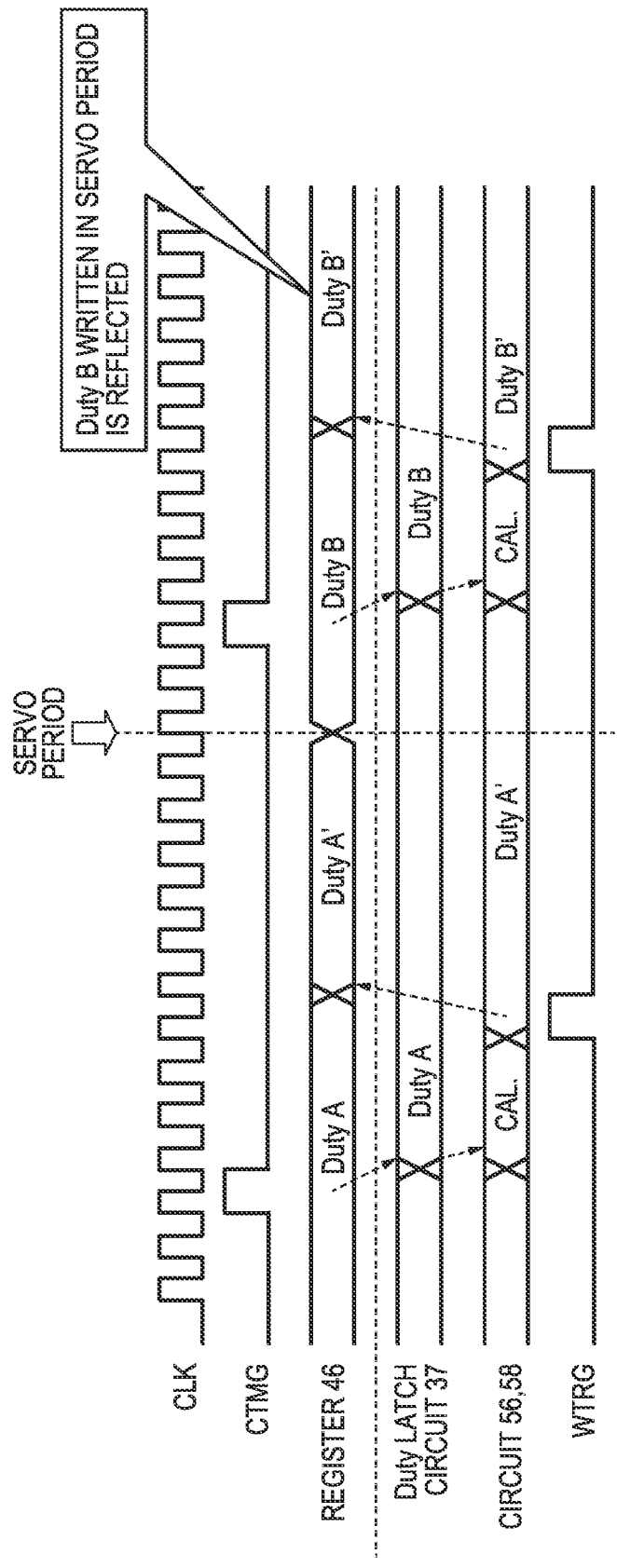
FIGS. 10A, 10B, and 10C are timing charts each showing the relationship between the contents of a register and signals used by the state quantity estimation unit and the synthesizing unit.
Figure 10B:
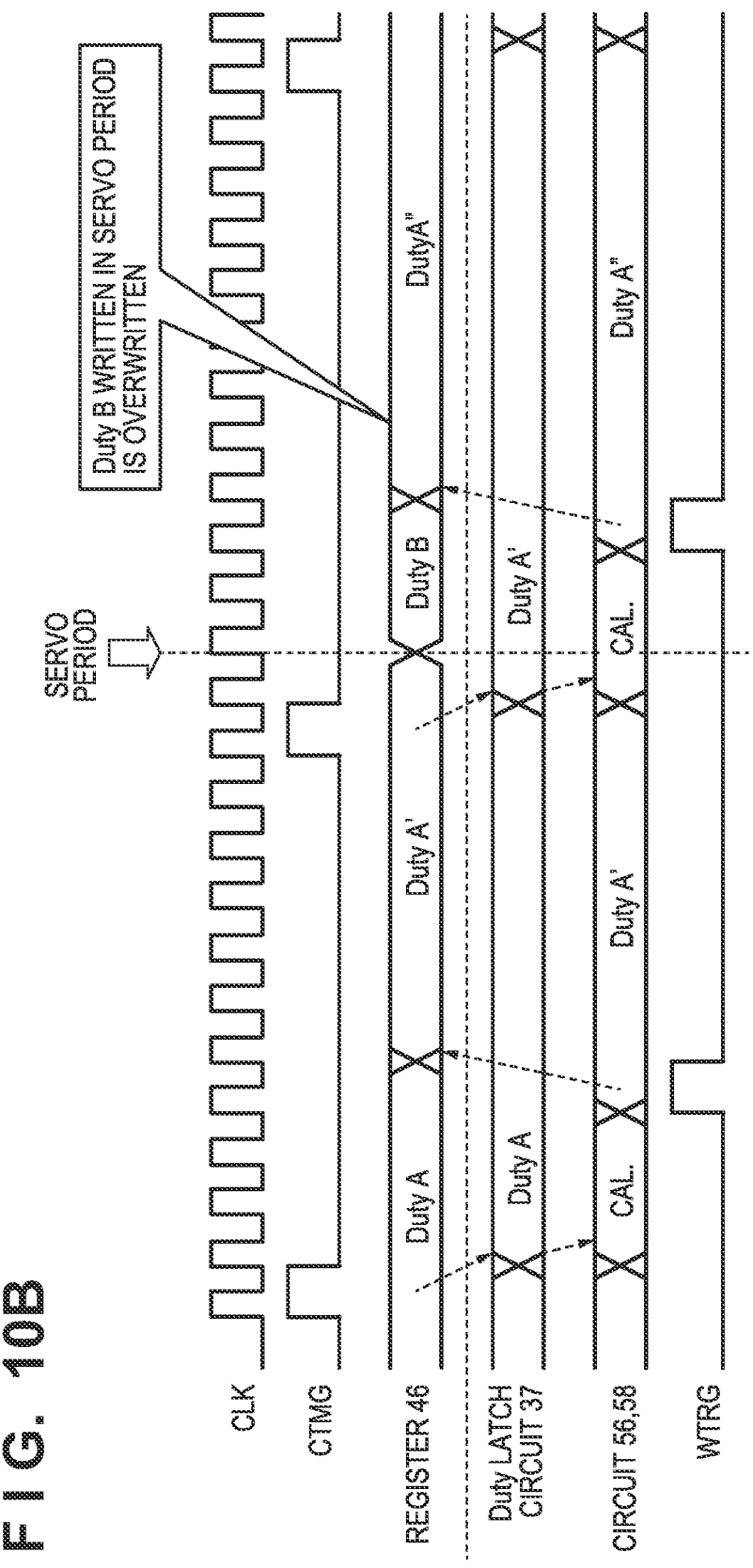
Figure 10C:
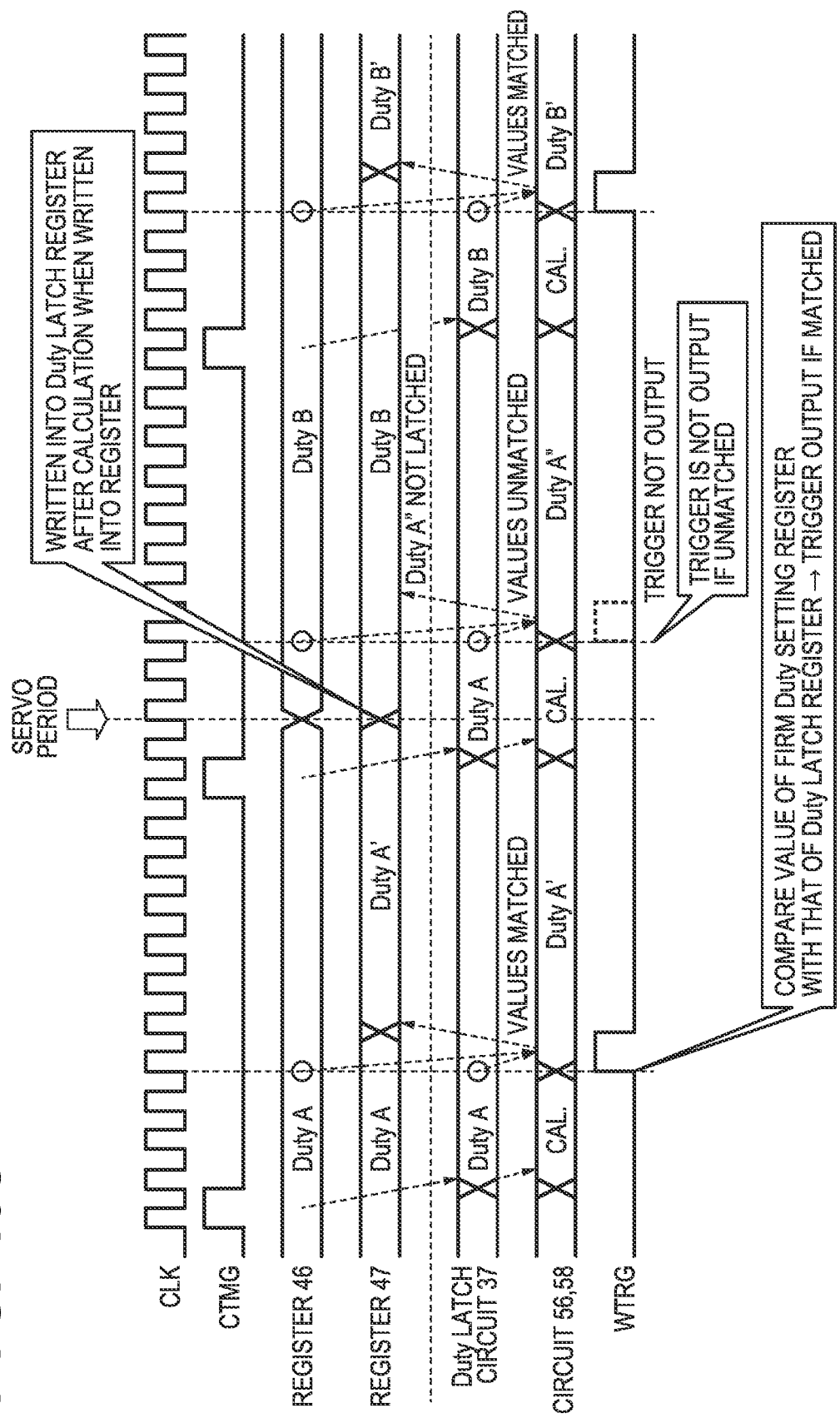

FIGS. 10A to 10C are timing charts each showing the relationship between the contents of the register and the signals used by the state quantity estimation unit 25 and the synthesizing unit 26. Note that in FIGS. 10A to 10C, CLK represents a basic clock signal used to control each unit, CTMG represents the calculation timing signal generated by the calculation timing generation unit 33, and WTRG represents the write timing trigger generated by the write timing trigger generation unit 55. Furthermore, FIGS. 10A to 10C each show the temporal transition of the contents stored in the registers 46 and 47, the temporal transition of the calculation result of the Duty latch circuit 37, the temporal transition of the calculation result output of the Duty addition/subtraction unit 56 and the Duty value determination unit 58.

As is apparent from the arrangement shown in FIG. 8, for the register 47, there are a timing of setting the Duty that is output from the MPU 601 and is also set in the register 46, and a timing of setting the determined Duty that is output from the Duty value determination unit 58.

FIG. 10A shows a state in which each unit normally operates in the conventional arrangement. FIG. 10B shows a state in which inconsistency between the PWM_Period value and the Duty value occurs in the conventional arrangement. FIG. 10C shows a result obtained by setting timing control when the register 47 is provided according to this embodiment.

As shown in FIG. 10A, if each unit normally operates, the contents of the register 46 are rewritten at the period of servo control by the first feedback loop. On the other hand, at the input timing of the calculation timing signal (CTMG), the Duty latch circuit 37 latches the Duty set in the register 46. At the input timing of the write timing trigger (WTRG), the determined Duty that has been calculated by the Duty addition/subtraction unit 56 and determined by the Duty value determination unit 58 is written in the register 46.

However, if the output of the write trigger timing (WTRG), that is, the timing of updating the register by the calculation result of the Duty addition/subtraction unit 56 and the timing of updating the register by the MPU 601 are asynchronous with each other, this is disadvantageous, as shown in FIG. 10B. That is, if the Duty written at the period of servo control by the first feedback loop by the MPU 601 is disadvantageously overwritten in the register 46.

To solve this problem, upon receiving the calculation end trigger from the Duty addition/subtraction unit 56, the write timing trigger generation unit 55 compares the Duty value latched by the Duty latch circuit 37 with that set in the register 46, as follows. Then, the write timing trigger generation unit 55 outputs the write timing trigger (WTRG) based on a comparison result.

Figure 11:
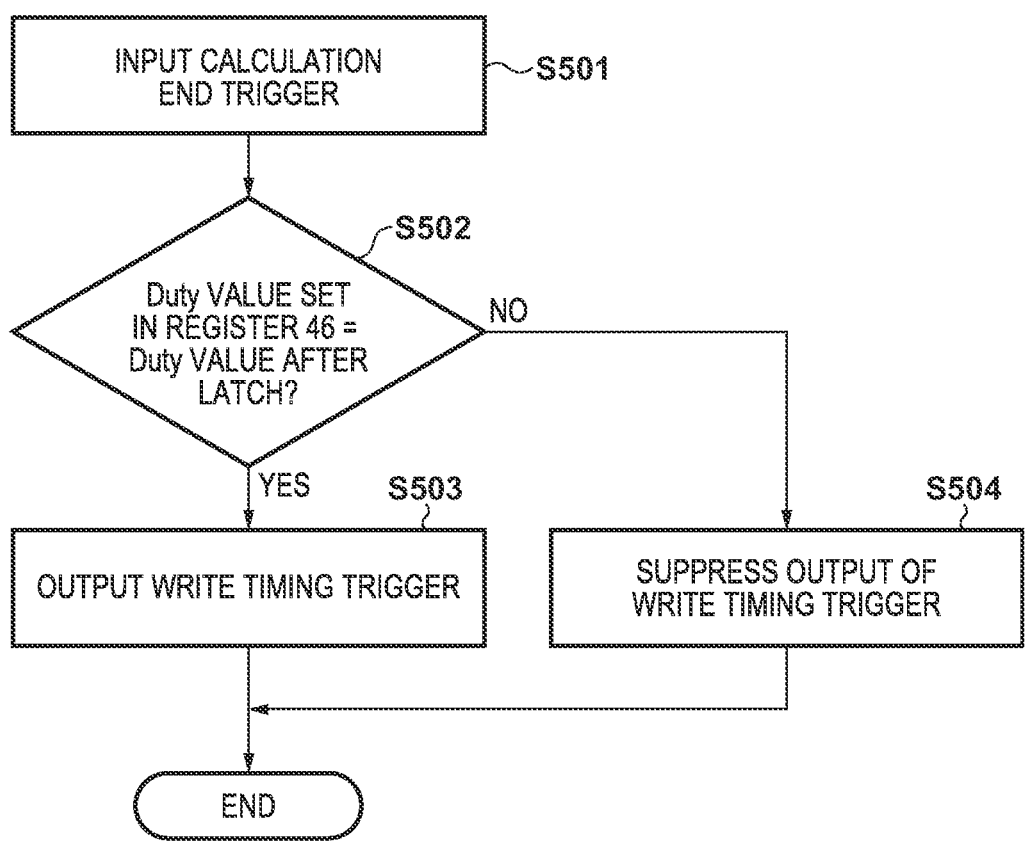
FIG. 11 is a flowchart illustrating the operation of a write timing trigger generation unit.

FIG. 11 is a flowchart illustrating the operation of the write timing trigger generation unit 55.

In step S501, in response to the input of the calculation end trigger from the Duty addition/subtraction unit 56, the operation starts. In step S502, the Duty value set in the register 46 is compared with the latched Duty value that is output from the Duty latch circuit 37. If the compared values are equal to each other (the values match), the process advances to step S503, and the write timing trigger (WTRG) is output to the register 47. That is, the determined Duty is output to the register 47. On the other hand, if the compared values are not equal to each other (the values do not match), the process advances to step S504, and no write timing trigger (WTRG) is output. That is, the output of the determined Duty is inhibited, and the register 47 is not updated.

The register 47 outputs the calculated Duty value to the selector 48. The selector 48 can be switched by the MPU 601, and selects the Duty value set in the register 46 when executing the conventional PID control (that is, when only control by the first feedback loop is performed). On the other hand, when executing both the first and second feedback loops, the value in the register 47 is selected and PWM_Duty is output to the PWM output generation unit 49.

Therefore, according to the above-described embodiment, in carriage driving control of the printing apparatus to which the feedback control arrangement formed from the first and second control units is applied, it is possible to execute control from the two feedback loops without contradiction. This can suppress the velocity vibration of the carriage which cannot be suppressed conventionally. As a result, compatibility between vibration suppression and traceability of the carriage as the control target object of the feedback control can be achieved, and it is possible to perform carriage driving control more precisely, thereby implementing high-quality image printing.

Figure 12:
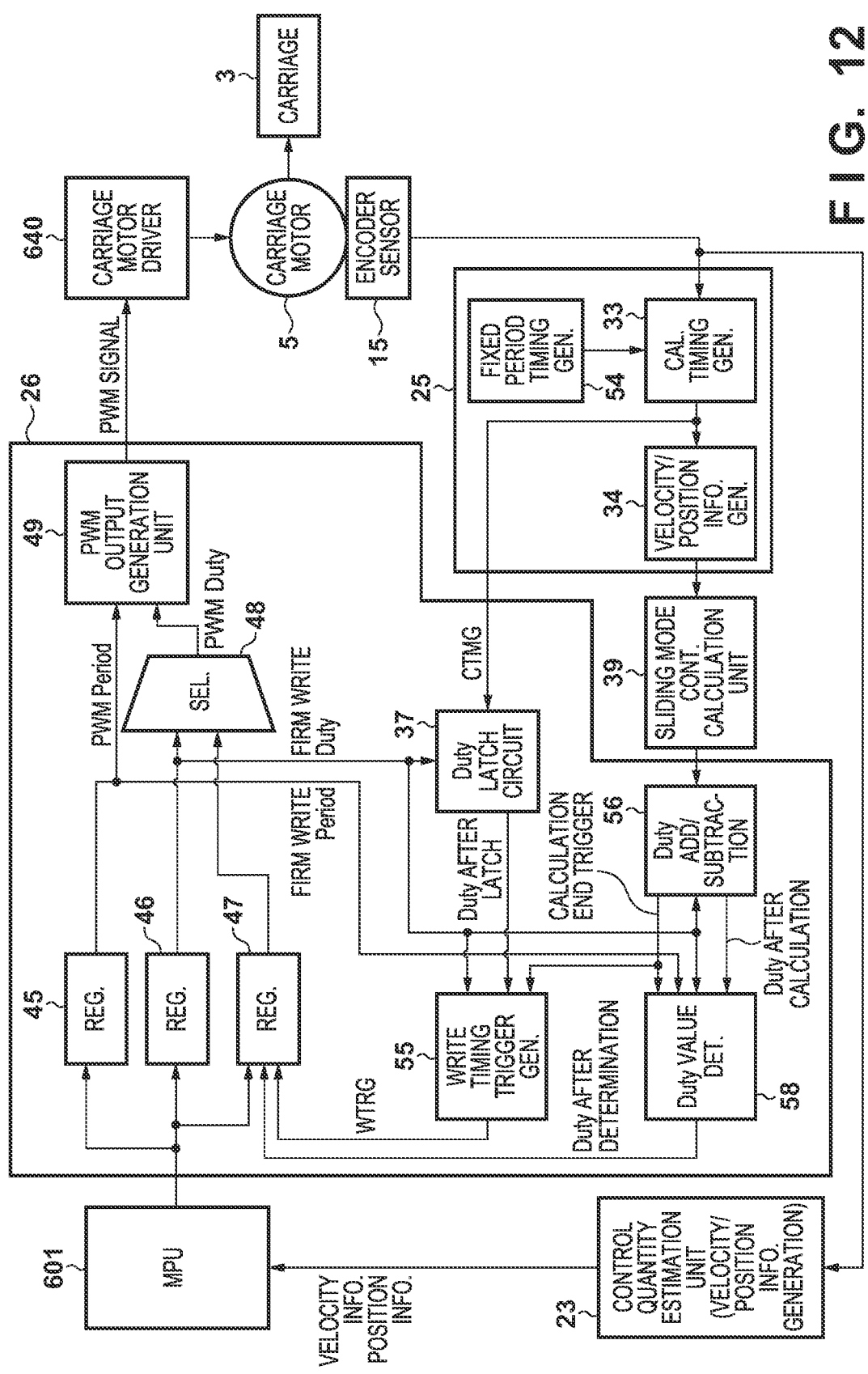
FIG. 12 is a block diagram showing another embodiment of the detailed arrangements of the state quantity estimation unit and the synthesizing unit.

Note that in the above-described embodiment, if calculation is performed at a timing by using, as a trigger, the encoder signal from the encoder sensor 15, the calculation period is influenced by the rotational velocity of the carriage motor 5. To solve this problem, as shown in FIG. 12, a fixed period timing generation unit 54 having a function of generating a timing signal at a period set in the register and outputting it to the calculation timing generation unit 33 may be added to the state quantity estimation unit 25. This allows the calculation timing generation unit 33 to select input of the encoder signal from the encoder sensor 15 or input of the timing signal from the fixed period timing generation unit 54, and generate the calculation timing signal (CTMG).

With this arrangement, it is possible to calculate the second operation quantity at a period that is not influenced by the rotational velocity of the carriage motor, thereby performing control without suffering the influence of an external disturbance.

Note that in FIG. 12, components other than the fixed period timing generation unit 54 are the same as those shown in FIG. 8, and are thus denoted by the same reference numerals, and a description thereof will be omitted.

4. Explanation of Another Application Example of Feedback Control

The present invention is applicable to any control of moving an object by driving the motor, as described above. Therefore, the present invention is applicable to, for example, control of the scanner motor that moves the CCD sensor or the CIS of the scanner apparatus having a single function or the scanner unit of a multi-function printer (MFP).

To ensure the image reading performance, the scanner unit needs to acquire an image signal by matching the movement quantity of the scanner unit and the light source lighting timing of the CCD sensor or the CIS. Since the light source lighting timing generally assumes that the moving velocity of the scanner unit is constant, it is important to suppress the velocity vibration of the scanner unit. Therefore, since the vibration target to be suppressed is the moving velocity of the scanner unit, the combination of the state quantities of the velocity and the acceleration is applied to the above-described second control unit. Basically, control is performed with the same arrangement as the carriage control arrangement described with reference to FIG. 6.

This can suppress a micro-vibration at a high-frequency of the scanner unit, which cannot be suppressed by only the conventional control, and improve the feedback control traceability. As a result, high-quality image reading can be achieved.

The present invention is also applicable to conveyance roller driving control of the printing apparatus described with reference to FIGS. 4 and 5. The printing apparatus rotates the conveyance roller for each carriage scanning operation to intermittently convey the print medium. To suppress a conveyance quantity vibration at this time, feedback control according to the present invention can be applied. In this case, since the control target object is the conveyance quantity (position vibration) of the print medium, the rotation quantity and rotational velocity of the conveyance roller are respectively input as the first and second state quantities to the above-described second control unit.

This can implement more precise conveyance control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-087538, filed Apr. 27, 2018, which is hereby incorporated by reference herein in its entirety.

What is claimed is:

1. An electric apparatus for controlling movement of a target object, comprising:
    a central processing unit (CPU);
    an application-specific integrated circuit (ASIC);
    a motor configured to move the target object;
    a sensor configured to detect the movement of the target object;
    a first estimation unit configured to estimate, based on a detection signal output from the sensor, a control quantity for performing first feedback control in a first period;
    a second estimation unit configured to estimate, based on the detection signal output from the sensor, a velocity of the target object and an acceleration obtained by time differentiation of the velocity in a second period shorter than the first period;
    a first generation unit implemented by the CPU and configured to generate, based on the control quantity estimated by the first estimation unit, a first operation quantity for driving the motor in order to perform the first feedback control for the target object in the first period;
    a second generation unit implemented by the ASIC and configured to generate, based on the velocity and the acceleration estimated by the second estimation unit, a second operation quantity for driving the motor in order to perform second feedback control for the target object in the second period;
    a synthesizing unit implemented by the ASIC and configured to synthesize the first operation quantity and the second operation quantity to generate a third operation quantity for driving the motor; and
    a comparison unit implemented by the ASIC and configured to compare the third operation quantity with a maximum value of values that can be taken as the first operation quantity,
    wherein, within a constant movement region of a velocity profile of the target object, when the maximum value is not less than the third operation quantity, the motor is controlled using the third operation quantity from the synthesizing unit, and when the maximum value is less than the third operation quantity, the motor is controlled using the first operation quantity from the first generation unit.

2. The apparatus according to claim 1, further comprising:
    a motor driver configured to drive the motor, wherein the motor is controlled using the first operation quantity via the motor driver or using the third operation quantity via the motor driver.

3. The apparatus according to claim 2,
    wherein the first operation quantity and the second operation quantity are duty values of a pulse width modulation (PWM) signal used by the motor driver to drive the motor using the PWM signal.

4. The apparatus according to claim 3, wherein the maximum value that can be taken as the first operation quantity is a period of the PWM signal.

5. The apparatus according to claim 1,
    wherein a sign of the second operation quantity is determined based on the velocity and the acceleration estimated by the second estimation unit.

6. The apparatus according to claim 1, wherein
    the electric apparatus comprises a printing apparatus configured to print on a print medium with a printhead by reciprocally moving a carriage mounted with the printhead, and
    the target object comprises the carriage.

7. The apparatus according to claim 6, wherein
    the velocity of the target object comprises the velocity of the carriage, and
    the acceleration comprises the acceleration of the carriage.

8. The apparatus according to claim 6, wherein
    the sensor includes an encoder sensor configured to detect a position of the carriage, and
    the position of the carriage is estimated by counting a pulse signal of an encoder signal output from the encoder sensor, and the velocity of the carriage is estimated by measuring a pulse width of the pulse signal.

9. The apparatus according to claim 1, wherein
    the electric apparatus comprises one of a scanner apparatus configured to read an image of an original by a scanner unit mounted with a contact image sensor (CIS) or a charge coupled device (CCD) sensor by moving the scanner unit, and a multi-function printer obtained by providing the scanner apparatus in a printing apparatus for printing on a print medium with a printhead by reciprocally moving a carriage mounted with the printhead, and
    the target object comprises the scanner unit.

10. The apparatus according to claim 1, further comprising:
    a first register to which the value related to the first operation quantity is written; and
    a second register to which an operation quantity used to control the motor is written.

11. The apparatus according to claim 1, further comprising:
    a register to which the first operation quantity is written; and
    a latch circuit configured to latch a value in the register, wherein the ASIC outputs based on the value in the register and the value latched in the latch circuit.

12. The apparatus according to claim 1, wherein when the synthesizing unit terminates a synthesizing process, the comparison unit starts a comparison operation.

13. The apparatus according to claim 1, wherein the first operation quantity and the second operation quantity are updated asynchronously.

14. The apparatus according to claim 1, wherein the second operation quantity is determined based on a two-dimensional coordinate space representing the relationship between the velocity and the acceleration.

15. The apparatus according to claim 1, wherein if the first operation quantity is changed, the third operation quantity is not updated.

16. The apparatus according to claim 1, wherein if the third operation quantity is greater than the maximum value, inconsistency occurs in the third operation quantity.

17. A control method for an electric apparatus for controlling movement of a target object, the electric apparatus including a central processing unit (CPU), an application-specific integrated circuit (ASIC), and a motor configured to move the target object, the method comprising:
   detecting the movement of the target object;
   estimating, based on the detection signal output by the detecting, a control quantity for performing first feedback control in a first period;
   estimating, based on the detection signal output by the detecting, a velocity of the target object and an acceleration obtained by time differentiation of the velocity in a second period shorter than the first period;
   generating, with the ASIC, based on the control quantity estimated in the first estimating, a first operation quantity for driving the motor in order to perform the first feedback control for the target object in the first period;
   generating, with the ASIC, based on the velocity and the acceleration estimated in the second estimating, a second operation quantity for driving the motor in order to perform second feedback control for the target object in the second period;
   generating, with the ASIC, a third operation quantity for driving the motor by synthesizing the first operation quantity and the second operation quantity; and
   comparing, with the ASIC, the third operation quantity with a maximum value of values that can be taken as the first operation quantity,
   wherein, within a constant movement region of a velocity profile of the target object, when the maximum value is not less than the third operation quantity, the motor is controlled using the third operation quantity, and when the maximum value is less than the third operation quantity, the motor is controlled using the first operation quantity.

* * * * *